United States Patent
Shah

(10) Patent No.: US 12,430,454 B2
(45) Date of Patent: Sep. 30, 2025

(54) DATABASE SYSTEMS AND METHODS FOR SECURELY SHARING A RECORD WITHIN A CONVERSATION

(71) Applicant: salesforce.com, inc., San Francisco, CA (US)

(72) Inventor: Mihirkumar Shah, Gujarat (IN)

(73) Assignee: Salesforce, Inc.

( * ) Notice: Subject to any disclaimer, the term of this patent is extended or adjusted under 35 U.S.C. 154(b) by 876 days.

(21) Appl. No.: 17/456,927

(22) Filed: Nov. 30, 2021

(65) Prior Publication Data
US 2023/0169195 A1    Jun. 1, 2023

(51) Int. Cl.
*G06F 21/62*    (2013.01)

(52) U.S. Cl.
CPC ...... *G06F 21/6209* (2013.01); *G06F 21/6245* (2013.01)

(58) Field of Classification Search
CPC ..... H04L 63/08; H04L 63/101; H04L 63/105; H04L 51/08; H04L 63/102; H04L 51/04; H04L 63/107
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

OTHER PUBLICATIONS salesforce.com, Mention Salesforce Records in Microsoft Teams Channels and Chats, webpage, https://help.salesforce.com/s/articleView?id=teams_int_user_mention_records.htm&type=5&language=en_US.

(Continued)

*Primary Examiner* — Jerry B Dennison
(74) *Attorney, Agent, or Firm* — Ingrassia Fisher & Lorenz, LLP

(57) ABSTRACT

Systems and methods are provided for securely sharing database records in the context of a conversation at a communication platform using a secure sharing service. The secure sharing service identifies an external system user identifier for a participant in the conversation at the communication platform using an identifier associated with the participant at the communication platform, identifies permissions associated with the data record at the external system, and identifies a subset of fields of the data record viewable by the participant using the external system user identifier. The secure sharing service obtains values for the identified subset of fields of the data record from the external computing system and automatically generates a shared data record message associated with the conversation at the communication platform that includes the obtained values for the identified subset of fields of the data record.

20 Claims, 13 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,958,600 B1 * | 3/2021 | Annadata ............... H04L 51/02 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0072841 A1 * | 3/2016 | Caporal ............. G06F 3/04845 726/1 |
| 2017/0041296 A1 * | 2/2017 | Ford ........................ G06F 21/64 |
| 2020/0204675 A1 * | 6/2020 | Zhou ........................ H04W 4/12 |

OTHER PUBLICATIONS salesforce.com, Integration with Microsoft Teams Features, Webpage https://help.salesforce.com/s/articleView?id=sf.teams_int_features. htm&type=5.

(56) References Cited

OTHER PUBLICATIONS salesforce.com, Manage the Salesforce Integration with Teams, Webpage, https://help.salesforce.com/s/articleView?id=sf.teams_int_manage_parent.htm&type=5.

* cited by examiner

DATABASE SYSTEMS AND METHODS FOR SECURELY SHARING A RECORD WITHIN A CONVERSATION

TECHNICAL FIELD

One or more implementations relate to the field of database systems, and more specifically, to securely sharing database records in the context of a conversation at a communication platform.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects. In this regard, it is often desirable to retrieve or incorporate data or information from various different websites, platforms, database systems, or the like into a conversation at a web application or website in order to improve collaboration or otherwise enhance or improve the user experience. Various protocols have been developed to facilitate sharing data or information across different websites and applications. However, existing protocols may fail to account for different access restrictions imposed at the database system where the data being shared originates and/or persistently maintain shared data, thereby risking unauthorized access to the shared data. Accordingly, it is desirable to facilitate data integration across different platforms or systems with improved security to limit unauthorized access to shared data.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
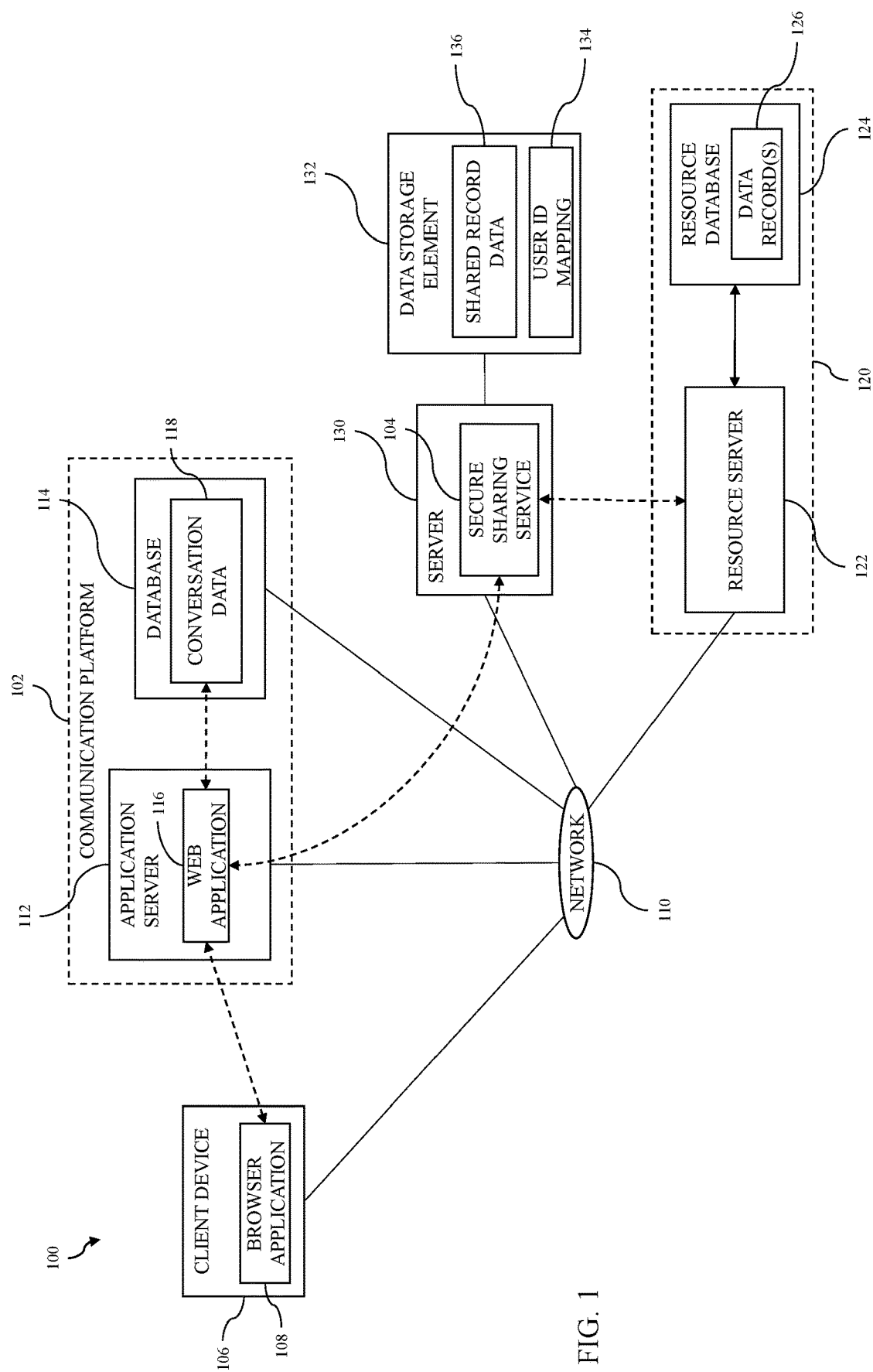
FIG. 1 is a block diagram illustrating a computing system including a secure sharing service according to some example implementations.

The subject matter described herein generally relates to securely sharing data records with one or more participants in a conversation at a communication platform in a manner that enforces field-level security (FLS) and other access restrictions to prevent unauthorized access to data fields or other data leakage. A participant in a conversation supported by the communication platform invokes a secure sharing service within the conversation to share an identified data record residing at an external system as a message or utterance within the conversation. The secure sharing service utilizes identifier(s) associated with the participant attempting to share the data record (alternatively referred to herein as the message sender) and the other participant(s) who will view the shared data record message (alternatively referred to herein as the message recipient(s)) to identify or otherwise determine a viewable subset of fields of the data record based on the permissions associated with the data record at the external system. In one or more embodiments, the viewable subset of fields includes only those fields of the data record that are viewable or otherwise accessible by both the message sender and the message recipient. The secure sharing service obtains the viewable subset of fields of the shared data record from the external system and automatically generates a shared data record message including the viewable subset of fields to be displayed or otherwise presented within the conversation.

As described in greater detail below, the shared data record message generated by the secure sharing service is user-specific or recipient-specific. For direct messages exchanged within a conversation between two participants, the shared data record message automatically includes the viewable subset of fields that are viewable or otherwise accessible by both the message sender and the message recipient, that is, the mutually inclusive intersection of the fields where the permissions associated with the data record allow both the message sender and the message recipient to view or access those fields. For group messages exchanged within a group conversation, the secure sharing service generates a button or similar graphical user interface (GUI) element, that, when selected by a particular participant in the group conversation, causes the secure sharing service to automatically generate a user-specific shared data record message that includes only those fields viewable or accessible to that participant in the group conversation. In some implementations, the user-specific shared data record message is ephemeral and does not persist beyond some temporary time period, thereby reducing the likelihood of data leakage. Additionally, in one or more exemplary implementations, the secure sharing service supports an asynchronous permissions monitoring process that detects changes to permissions with respect to the shared data record substantially in real-time to update or delete a shared data record message within a conversation to prevent unauthorized access when permissions change at the external system.

FIG. 1 depicts an exemplary system 100 for sharing data records 126 from an external computing system 120 within a conversation at a communication platform 102 over a communications network 110 using a secure sharing service 104. It should be appreciated that FIG. 1 depicts a simplified representation of the system 100 for purposes of explanation and is not intended to be limiting. In this regard, the communications network 110 may be realized as the Internet or any sort or combination of a wired and/or wireless computer network, a cellular network, a mobile broadband network, a radio network, or the like.

The communication platform 102 generally includes one or more servers 112, which generally represent a server computing device, server computing system or another combination of processing logic, circuitry, hardware, and/or other components that are coupled to the network 110 and configurable to support instances of a web application 116 that supports conversational interactions between users of different client devices 106 coupled to the network 110. In this regard, the server 112 generally includes a processing system, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system may include or otherwise access a data storage element (or memory) capable of storing programming instructions for execution by the processing system, that, when read and executed, are configurable cause processing system to create, generate, or otherwise facilitate the web application 116 based at least in part upon code and other data that is stored or otherwise maintained by the memory and support the subject matter described herein. In one or more implementations, the programming instructions cause the processing system at the server 112 to create, generate, or otherwise facilitate an application platform that generates, supports or otherwise facilitates instances of the web application 116 using data that is stored or otherwise maintained by a database 114. For purposes of explanation, the server 112 may alternatively be referred to herein as an application server.

In exemplary embodiments, the web application 116 includes or otherwise supports chat messaging, text messaging, instant messaging or a similar feature where users communicate or otherwise interact with one another in the context of a conversation using the web application 116. In this regard, the conversations may be unstructured and free-form using natural language that is not constrained to any particular syntax or ordering of speakers or utterances thereby. An utterance should be understood as a discrete uninterrupted chain of language provided by an individual speaker or source, which could be a human user (e.g., a customer, a sales representative, a live agent, a coworker, and/or the like) or an automated speaker (e.g., an automated message generated by a computer system). For example, in a chat messaging or text messaging context, each separate and discrete message that originates from a particular speaker that is part of the conversation constitutes an utterance associated with the conversation, where each utterance may precede and/or be followed by a subsequent utterance by the same speaker or a different speaker within the conversation. In practice, the application server 112 and/or the web application 116 stores or otherwise maintains conversation data 118 for a conversation in the database 114. For example, the conversation data 118 may include a transcript for each conversation existing within instances of the web application 116 at the communication platform 102 that maintains the sequence of utterances associated with the conversation and the respective speaker or source of each respective utterance of the conversation. The conversation data 118 for a given conversation may also include user identifiers or other information identifying the participants associated with the conversation and other metadata associated with the conversation, such as, for example, whether or not the conversation is a group conversation, whether or not the group conversation is public or private, and the like. For example, some implementations of the web application 116 may support public channels, private channels, one-to-one direct messages and group messages.

The client device 106 generally represents an electronic device coupled to the network 110 that may be utilized by a user to communicate with other users via the web application 116 supported by the communication platform 102. In practice, the client device 106 can be realized as any sort of personal computer, mobile telephone, tablet or other network-enabled electronic device. In exemplary implementations, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The client device 106 executes or otherwise supports a client application 108 that supports communication with the application platform on the application server 112 to access an instance of the web application 116 using a networking protocol. For example, in one or more implementations, the client application 108 is realized as a web browser or similar local client application executed by the client device 106 that contacts the application server 112 using a networking protocol, such as the hypertext transport protocol (HTTP) or the like, which, in turn, causes the application server 112 to generate or otherwise provide an instance of the web application 116 within the client application 108.

In exemplary implementations, a user of the client device 106 may interact with the web application 116 to initiate or otherwise invoke the secure sharing service 104 to share a data record 126 residing at an external computing system 120 within the context of a conversation at the communication platform 102. In this regard, the secure sharing service 104 may be realized as an application programming interface (API), software agent, or the like that is capable of interacting with the external computing system 120 and/or the resource server 122 to obtain data or other information from the external computing system 120, as described in greater detail below. For example, a graphical user interface (GUI) display associated with the web application 116 may include a GUI element that is manipulable by a user to input or otherwise provide indicia of a data record 126 at an external computing system 120 that the user would like to access and share within the context of the current conversation depicted within the GUI display. In other implementations, the user may input a command within the context of the current conversation that identifies the desired data record 126 to be shared and is configured to invoke the secure sharing service 104.

In the illustrated implementation depicted in FIG. 1, the external computing system 120 includes a resource server 122 communicatively coupled to the network 110 to support access to individual data, information, or other protected resources maintained in a resource database 124. In this regard, the resource server 122 generally represents a server computing device, server computing system or another combination of processing logic, circuitry, hardware, and/or other components configured to support remote access to data maintained in the resource database 124 via the network 110. For example, the resource database 124 may maintain, on behalf of a user, tenant or other resource owner, data records entered or created by that resource owner (or users associated therewith), files, objects or other records uploaded by the resource owner (or users associated therewith), and/or files, objects or other records generated by one or more computing processes (e.g., by the resource server 122 based on user input or other records or files stored in the resource database 124). In some implementations, the external computing system 120 is physically and logically distinct from the communication platform 102 and the application server 112. For example, the external computing system 120 may be owned, controlled, or otherwise operated by a third party different from the parties that own, control and/or operate the communication platform 102 and/or the secure sharing service 104. That said, in other implementations, the external computing system 120 is affiliated with the same party that owns, controls and/or operates the communication platform 102 and/or the secure sharing service 104.

In one or more embodiments, the external computing system 120 is realized as an on-demand multi-tenant database system that is capable of dynamically creating and supporting virtual applications based upon data from a common resource database 124 that is shared between multiple tenants, which may alternatively be referred to herein as a multi-tenant database. Data and services generated by the virtual applications may be provided via the network 110 to any number of client devices, as desired, where instances of the virtual application may be suitably generated at run-time (or on-demand) using a common application platform that securely provides access to the data in the resource database 124 for each of the various tenants subscribing to the multi-tenant system. In accordance with one non-limiting example, the external computing system 120 is implemented in the form of an on-demand multi-tenant customer relationship management (CRM) system that can support any number of authenticated users of multiple tenants. In this regard, one or more implementations of the external computing system 120 support one or more application program interfaces (APIs) at the resource server 122 that allow the secure sharing service 104 and other web applications 116 and/or application servers 112 on the network 110 that have been authorized by an authentication service to access and perform operations with respect to an individual tenant's data maintained in the resource database 124 that would otherwise be secured and inaccessible to unauthorized third parties.

As described in greater detail below, the secure sharing service 104 utilizes identifiers associated with participants in the conversation at the communication platform 102 where a data record 126 is to be shared to determine corresponding identifiers for those participants at the external computing system 120, which, in turn, are utilized to determine the permissions associated with the shared data record 126 with respect to the participants in the conversation. In exemplary implementations, the secure sharing service 104 maintains or otherwise utilizes a user identifier mapping data 134 that maps the unique user identifier associated with a particular user at the communication platform 102 to a corresponding unique user identifier associated with that same user at the resource system 120, thereby allowing that secure sharing service 104 to obtain authorization to access data records 126 at the external computing system 120 in accordance with the permissions associated with that user at the external computing system 120. In this regard, in some implementations, when a user at the communication platform 102 lacks a corresponding unique user identifier at the resource system 120, the secure sharing service 104 may be configurable to create or otherwise utilize a default guest user identifier to provide that user guest level permissions with respect to the resource system 120.

Based on the read access permissions and field-level security permissions with respect to the conversation participants, the secure sharing service 104 identifies the subset of fields of a shared data record 126 that are viewable by a conversation participant based at least in part on the permissions associated with the data record using the user identifier. The obtained fields of the shared data record 126 may be stored or otherwise maintained by the secure sharing service 104 as shared record data 136 associated with the particular conversation at the communication platform 102 (e.g., using a unique identifier associated with the conversation), which, in turn, is utilized by the secure sharing service 104 to automatically generate a shared data record message associated with the conversation at the communication platform 102 that includes the viewable subset of fields of the shared data record 126 obtained from the external computing system 120. In one implementation, the shared record data 136 includes a secure sharing table that maintains an association between an identifier associated with the conversation at the communication platform 102, the identifier associated with the shared data record 126 at the external computing system 120 (e.g., a record ID), the communication platform user identifier associated with the message sender, the mapped external system user identifier associated with the message sender, the communication platform user identifier associated with the message recipient and the mapped external system user identifier associated with the message recipient.

Still referring to FIG. 1, in the illustrated implementation, the secure sharing service 104 is implemented at a server 130 that generally represents a server computing device, server computing system or another combination of processing logic, circuitry, hardware, and/or other components that are coupled to the network 110 and configurable to support the secure sharing service 104. In this regard, the server 130 generally includes a processing system, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system may include or otherwise access a data storage element 132 (or memory) capable of storing programming instructions for execution by the processing system, that, when read and executed, are configurable cause processing system to create, generate, or otherwise facilitate the secure sharing service 104 based at least in part upon code and other data that is stored or otherwise maintained by the data storage element 132 and support the subject matter described herein. Depending on the implementation, the data storage element 132 may be realized as a random-access memory (RAM), read only memory (ROM), flash memory, magnetic or optical mass storage, or any other suitable non-transitory short or long-term data storage or other computer-readable media, and/or any suitable combination thereof. It should be noted that although FIG. 1 depicts the secure sharing service 104 as being implemented separately from the communication platform 102 and the external computing system 120, in practical implementations, the secure sharing service 104 may be integrated with or otherwise implemented at one of the communication platform 102 and the external computing system 120, or the secure sharing service 104 may be implemented in a distributed manner across both the communication platform 102 and the external computing system 120.

Figure 2:
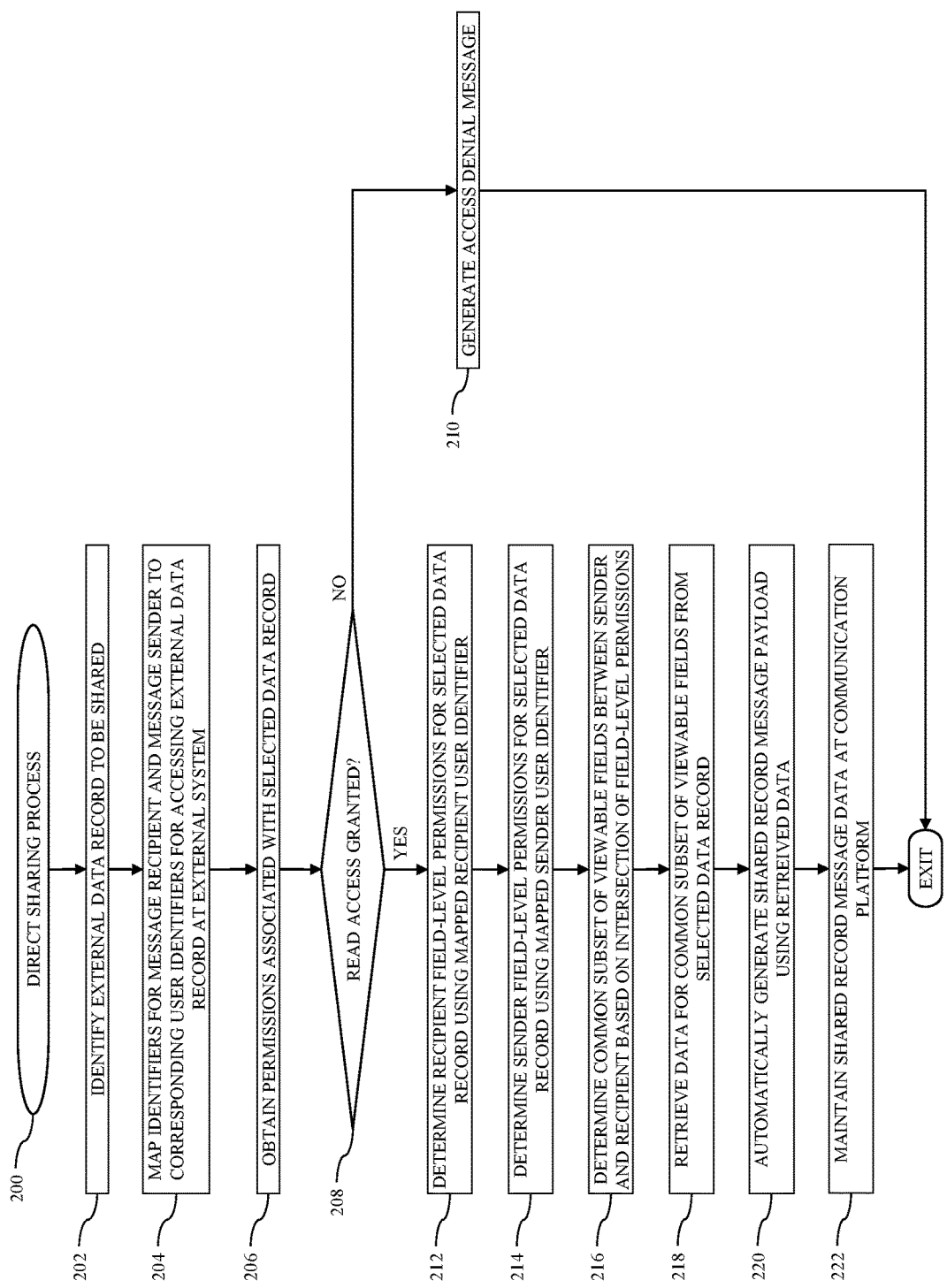
FIG. 2 is a flow diagram illustrating a direct sharing process suitable for implementation by a secure sharing service in the computing system of FIG. 1 according to some example implementations.

FIG. 2 depicts an exemplary direct sharing process 200 that may be implemented or otherwise performed to share access to a data record at an external system with a participant in a direct message conversation at a communication platform. For illustrative purposes, the following description may refer to elements mentioned above in connection with FIG. 1. In this regard, while portions of the direct sharing process 200 may be performed by different elements of the computing system 100, for purposes of explanation, the subject matter is described herein in the context of the direct sharing process 200 being primarily performed by the secure sharing service 104. It should be appreciated that the direct sharing process 200 may include any number of additional or alternative tasks, the tasks need not be performed in the illustrated order and/or the tasks may be performed concurrently, and/or the direct sharing process 200 may be incorporated into a more comprehensive procedure or process having additional functionality not described in detail herein. Moreover, one or more of the tasks shown and described in the context of FIG. 2 could be omitted from a practical implementation of the direct sharing process 200 as long as the intended overall functionality remains intact.

Referring to FIG. 2, with continued reference to FIG. 1, the illustrated direct sharing process 200 is initiated or otherwise performed by the secure sharing service 104 when a participant in a direct message conversation at the communication platform 102 invokes the secure sharing service 104 to share access to a data record 126 at the external computing system 120 in the context of the direct message conversation. For example, when the secure sharing service 104 is invoked or otherwise receives a request to share a data record, the secure sharing service 104 may receive and analyze metadata associated with the conversation from which the request originates to determine whether the conversation is a direct message or a group message before initiating the direct sharing process 200. For purposes of explanation, the participant attempting to share access to the data record 126 may alternatively be referred to herein as the message sender, while the other participant in the direct message conversation with whom the access to the data record 126 is to be shared is alternatively referred to herein as the message recipient.

The illustrated direct sharing process 200 initializes or otherwise begins by identifying the external data record to be shared within the direct message conversation (task 202). In this regard, the message sender may provide a request to the secure sharing service 104 that includes an indication of the external computing system 120 where the desired data record to be shared resides along with an indication of the particular data record 126 that the message sender would like to share access to. Based on the external system associated with the data record to be shared, the direct sharing process 200 maps or otherwise translates the user identifiers associated with the direct message conversation participants to corresponding user identifiers associated with the conversation participants for accessing data at the external system (task 204). For example, the secure sharing service 104 may access a user identifier mapping table 134 that includes entries that maintain associations between a user's unique user identifier(s) at the communication platform 102 and that user's unique user identifier(s) at the external computing system 120.

In one or more implementations, to generate the user identifier mapping data 134, the secure sharing service 104 automatically generates a unique token (or nonce) to be associated with a particular user at the communication platform 102 and passes the token into the uniform resource locator (URL) of a web page behind authentication at the external computing system 120. Thereafter, when the user is authenticated at the external computing system 120 using his or her associated user identifier(s) and/or other authentication information at the external computing system 120, the unique token in the URL is utilized by the secure sharing service 104 to identify the communication platform user identifier associated with that user and thereby populate the user identifier mapping data 134 by binding that user's communication platform user identifier with the user's external system user identifier(s) and/or other authentication information used to authenticate the user at the resource system 120. In some implementations, to generate the user identifier mapping data 134, the secure sharing service 104 retrieves or otherwise obtains user information associated with a conversation participant from the communication platform 102 that is independent of the communication platform 102 (e.g., a user's email address, phone number, name, date of birth, and/or the like) and utilizes the user information to query the external computing system 120 for an existing unique user identifier associated with that conversation participant's user information. When a message recipient at the communication platform 102 does not have an existing unique user identifier at the external computing system 120, the secure sharing service 104 may automatically assign a default guest user identifier at the external computing system 120 to the message recipient at the communication platform 102. In this regard, the default guest user identifier at the external computing system 120 may be associated with the minimum level of permissions at the external computing system 120, for example, by only providing read access to public fields of public data records.

After determining user identifiers associated with the message participants at the external system, the direct sharing process 200 identifies or otherwise obtains permissions associated with the external data record to be shared at the external computing system and determines whether the conversation participants have read access to the data record (tasks 206, 208). In this regard, the secure sharing service 104 utilizes the user identifiers at the external computing system 120 to determine whether the security settings associated with the selected data record 126 allow both the message sender and the message recipient to access the data record 126. In some implementations, the secure sharing service 104 retrieves or otherwise obtains the security settings associated with the selected data record 126 from the external computing system 120 and then verifies or otherwise confirms that both the message sender and the message recipient have read access with respect to the selected data record 126. When the message sender and/or the message recipient does not have read access to the selected data record for sharing, the direct sharing process 200 generates or otherwise provides a message within the web application at the communication platform that indicates that access to the selected data record is denied (task 210).

When the conversation participants have read access to the data record, the direct sharing process 200 continues by identifying or otherwise determining the field-level permissions for the conversation participants. The direct sharing process 200 utilizes the mapped user identifier at the external computing system associated with the message recipient to identify or otherwise determine a first subset of fields of the selected data record that are viewable to the message recipient (task 212). In this regard, the first subset of fields of the selected data record 126 that are viewable to the message recipient reflect the message recipient's field-level permissions and the particular subset of fields of the selected data record 126 that the message recipient would be allowed to view if the message recipient were logged into the external computing system 120 to view the selected data record 126 at the external computing system 120. In a similar manner, the direct sharing process 200 utilizes the mapped user identifier at the external computing system associated with the message sender to identify or otherwise determine a second subset of fields of the selected data record that are viewable to the message sender (task 214). In this regard, the second subset of fields of the selected data record 126 that are viewable to the message sender reflect the message sender's field-level permissions and the particular subset of fields of the selected data record 126 that the message sender would be allowed to view if the message sender were logged into the external computing system 120 to view the selected data record 126 at the external computing system 120.

Based on the recipient field-level permissions and the sender field-level permissions, the direct sharing process 200 identifies or otherwise determines a common subset of viewable fields for both conversation participants based on the intersection or overlap between the subset of fields that are viewable to the message recipient and the subset of fields that are viewable to the message sender (task 216). In this regard, the secure sharing service 104 identifies the particular fields of the selected data record 126 that would be viewable by both or either the message sender or the message recipient at the external computing system 120. The direct sharing process 200 retrieves or otherwise obtains data for the common subset of viewable fields from the selected data record at the external computing system and automatically generates payload for a shared record message to be provided within the context of the direct message conversation using the retrieved data for the common subset of viewable fields (tasks 218, 220). For example, the secure sharing service 104 may generate or otherwise provide a query statement to the resource server 122 using the message sender user identifier at the external computing system 120 to retrieve only the subset of fields of the selected data record 126 that are viewable to both the message sender and the message recipient. The resource server 122 retrieves the values for the requested common subset of viewable fields of the selected data record 126 from the resource database 124 and provides the retrieved values for the requested common subset of viewable fields to the secure sharing service 104. In one or more implementations, the secure sharing service 104 utilizes a call to a REST API at the resource server 122 that is configured to retrieve the requested subset of fields of the selected data record 126 that are viewable to both the message sender and the message recipient.

In one or more implementations, the secure sharing service 104 stores or otherwise maintains the retrieved values for the common subset of viewable fields as shared record data 136. For example, the secure sharing service 104 may create an entry that maintains the retrieved values for the common subset of viewable fields in association with an identifier associated with the conversation at the communication platform 102. After retrieving values for the common subset of viewable fields, the secure sharing service 104 automatically generates a shared record message that includes the field names and corresponding retrieved values for the selected data record 126 and provides the shared record message to the web application 116 for presentation as an utterance in the context of the direct message conversation at the web application 116.

In one or more implementations, the shared data record message is stored or otherwise maintained at the communication platform 102 as part of the conversation data 118 associated with the direct message conversation (e.g., by creating an entry for a new utterance within the direct message conversation sequence that includes the shared data record message). In other implementations, the conversation data 118 associated with the direct message conversation is updated to include an identifier or reference to the corresponding shared record data 136, which, in turn, may be utilized by the web application 116 to retrieve the shared data record message via the secure sharing service 104 at run-time. In such implementations, the retrieved values for the viewable fields and other information contained within the shared data record message may be cached or otherwise temporarily maintained at the communication platform 102 while at least one of the message participants is actively viewing the direct message conversation or otherwise logged in to the communication platform 102.

Figure 3:
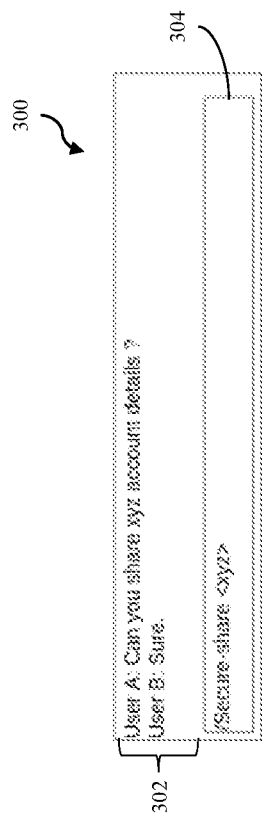
FIGS. 3-6 depict a sequence of graphical user interface (GUI) displays suitable for presentation by a web application at a communication platform in connection with the direct sharing process of FIG. 2 according to some example implementations.

FIGS. 3-6 depict an exemplary sequence of conversation GUI displays that may be generated or otherwise presented by the web application 116 within a client application 108 in the context of a direct message conversation at the communication platform 102 in connection with the direct sharing process 200. In this regard, FIG. 3 depicts an initial state of a conversation GUI display 300 presented by the web application 116 for a direct message conversation at the communication platform 102 between a message recipient (User A) and a message sender (User B). In some implementations, the conversation GUI display 300 is depicted using a widget or window-inside-browser-window in connection with an instance of the web application 116 provided to each of the client devices 106 associated with the conversation participants via respective instances of client application 108 executing thereon. The conversation GUI display 300 includes a conversation region 302 that includes graphical representations of the utterances exchanged between conversation participants in a sequential or chronological order. The conversation GUI display 300 also includes a text box 304 or similar GUI element where a user can input text or otherwise content for a message or other utterance to be added to the conversation and sent or otherwise presented to the other conversation participants. As shown in FIG. 3, to initiate the direct sharing process 200, the message sender may input a command to invoke the secure sharing service 104 within the text box 304 and provide indicia of the data record 126 that the user would like to share ("xyz") in connection with the command.

Figure 4:
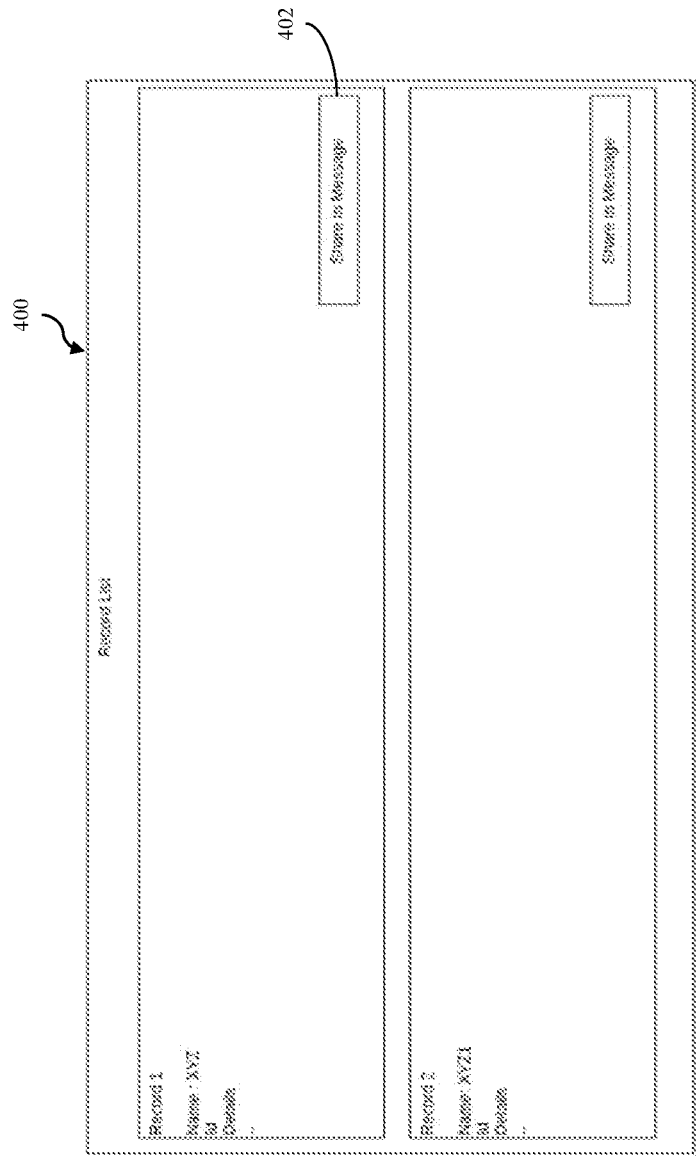

Referring to FIG. 4, in response to receiving indicia of the data record 126 residing at a particular external computing system 120 to be shared, in one or more implementations, the secure sharing service 104 queries or otherwise polls the resource server 122 to locate or otherwise identify the data record 126 matching the record identifier provided by the message sender. For example, the secure sharing service 104 may utilize the initiate a search of the external computing system 120 using the record name ("xyz") provided by the message sender as a search term. In response, the external computing system 120 may provide information identifying any matching data records 126 in the resource database 124 that are viewable to the message sender (e.g., where the message sender has read access). In this regard, FIG. 4 depicts a shared record selection GUI display 400 that may be presented by the secure sharing service 104 and/or the web application 116 when the secure sharing service 104 identifies multiple data records 126 at the external computing system 120 that substantially match or otherwise correspond to the record identifier provided by the message sender. The record selection GUI display 400 includes a listing of the external data records 126 identified as matching the record identification information provided by the user with additional identifying information associated with those records 126 that was obtained from the external computing system 120 (e.g., the record names, identifiers, and other descriptive data fields that are viewable to the message sender). For each identified record 126, the record selection GUI display 400 includes a button 402 or similar selectable GUI element manipulable by the message sender to select or otherwise indicate the desired data record 126 to be shared within the conversation.

Figure 5:
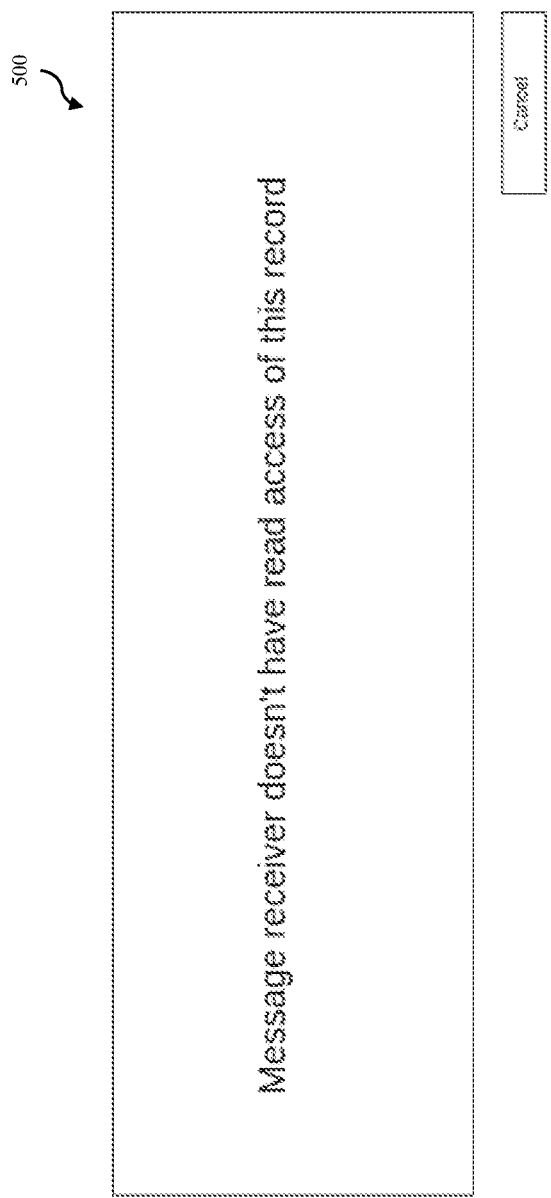

As described above in the context of FIG. 2, after identifying the selected data record 126 to be shared (e.g., task 202), the secure sharing service 104 utilizes the user identification mapping data 134 to map the user identifiers for the direct message conversation participants at the communication platform 102 to their associated user identifiers for authenticating or authorizing the direct message conversation participants at the external computing system 120 and then analyzes the permissions or other security settings associated with the selected data record 126 to confirm the conversation participants have read access to the selected data record 126 (e.g., tasks 204, 206, 208). In this regard, FIG. 5 depicts an access denied GUI display 500 that may be generated or otherwise provided by the secure sharing service 104 within the instance of the web application 116 at the message sender device 106 when the message recipient in the direct message conversation (User A) does not have read access with respect to the selected data record 126 (e.g., task 210).

Figure 6:
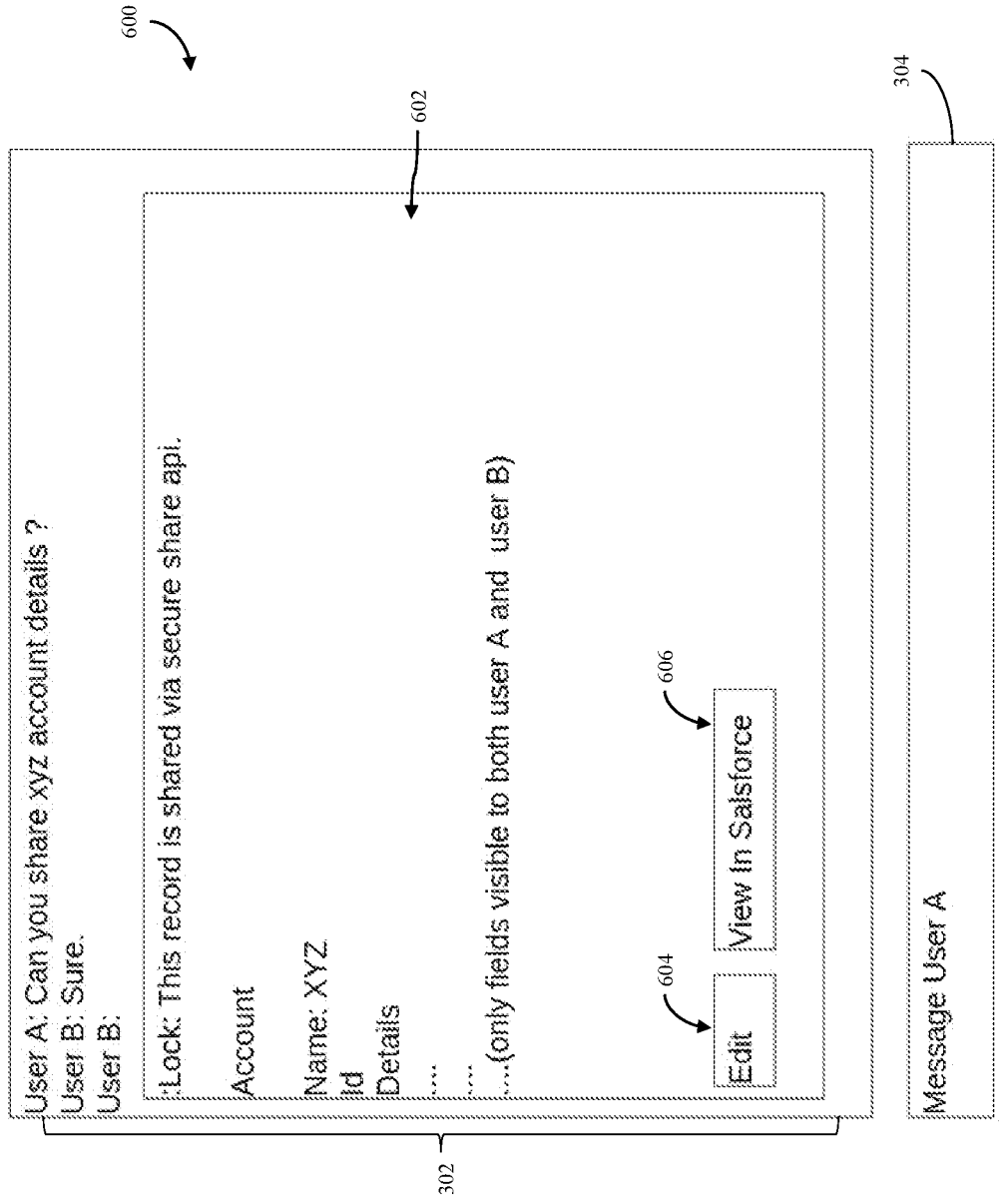

Referring to FIG. 6, when both direct message conversation participants have read access with respect to the selected XYZ account database object 126 for sharing, the secure sharing service 104 determines the field-level permissions for the selected data record 126 with respect to both direct message conversation participants to identify the common overlapping (or intersecting) subset of fields of the selected data record 126 that both direct message conversation participants have read access to (e.g., tasks 212, 214, 216). For example, the secure sharing service 104 utilizes the mapped external system user identifier for User A to verify that User A has read access to the shared XYZ account database object 126 at the external computing system 120 before analyzing User A's field-level permissions with respect to the field-level security settings associated with the shared XYZ account database object 126 at the external computing system 120 to identify which subset of fields of the shared XYZ account database object 126 are viewable to User A. The secure sharing service 104 then utilizes the mapped external system user identifier for User B to analyze User B's field-level permissions with respect to the field-level security settings associated with the shared XYZ account database object 126 at the external computing system 120 to identify which subset of fields of the shared XYZ account database object 126 are viewable to User B. The secure sharing service 104 then determines which fields of the shared XYZ account database object 126 are common to or otherwise included in both subsets and viewable by both User A and User B.

Thereafter, the secure sharing service 104 retrieves the values for the common subset of fields of the selected XYZ account database object 126 that are viewable to both User A and User B from the shared XYZ account database object 126 in the resource database 124 (e.g., via one or more query statements provided to the resource server 122) and stores the retrieved values in the shared record data 136 in association with the direct message conversation (e.g., task 218). The secure sharing service 104 automatically generates or otherwise provides the shared record payload including the retrieved values for the common subset of viewable fields for both User A and User B to the web application 116 for presentation to the direct message conversation participants (e.g., within respective instances of the conversation GUI display 600 at both the User A and User B client devices 106). In this regard, FIG. 6 depicts an updated conversation GUI display 600 that includes a graphical representation of the autogenerated shared data record message 602 within the context of the direct message conversation initially depicted in FIG. 3 where the autogenerated shared data record message 602 is generated as an utterance associated with the message sender (User B) within the conversation region 302 in a sequential or chronological manner. The depicted shared data record message 602 includes values for only those fields of the selected data record 126 that are viewable to both direct message conversation participants (User A and User B), such that both direct message conversation participants can concurrently view the same shared data record message 602 within their respective instances of the web application 116.

In the illustrated implementation, the shared data record message 602 includes buttons, hyperlinks, or similar selectable GUI elements 604, 606 that are manipulable by either direct message conversation participant to initiate or otherwise perform one or more actions with respect to the shared data record 126. For example, selection of an edit button 604 may allow either the message sender or the message recipient to edit the values for one or more of the common fields depicted within the shared data record message 602 if the user has write access to the respective field of the shared data record 126. In this regard, in a similar manner as described above, when the edit button 604 is selected, the secure sharing service 104 may analyze the field-level permissions associated with the respective conversation participant to verify the user has write access before allowing the user to modify the value for a depicted field. In response to receiving a user input modifying a value for a depicted field of the selected data record 126, the secure sharing service 104 may update the shared record data 136 in a corresponding manner while also transmitting or otherwise providing a command to the resource server 122 to update that particular field of the shared data record 126 in the resource database 124 to the input value provided by the user. Additionally, or alternatively, selection of another button 606 to view the shared data record 126 at the external computing system 120 may cause the client application 108 to automatically initiate an instance of a virtual application or other web application provided by the resource server 122 at the external computing system 120 to view the shared data record 126 within the context of the external computing system 120.

Figure 7:
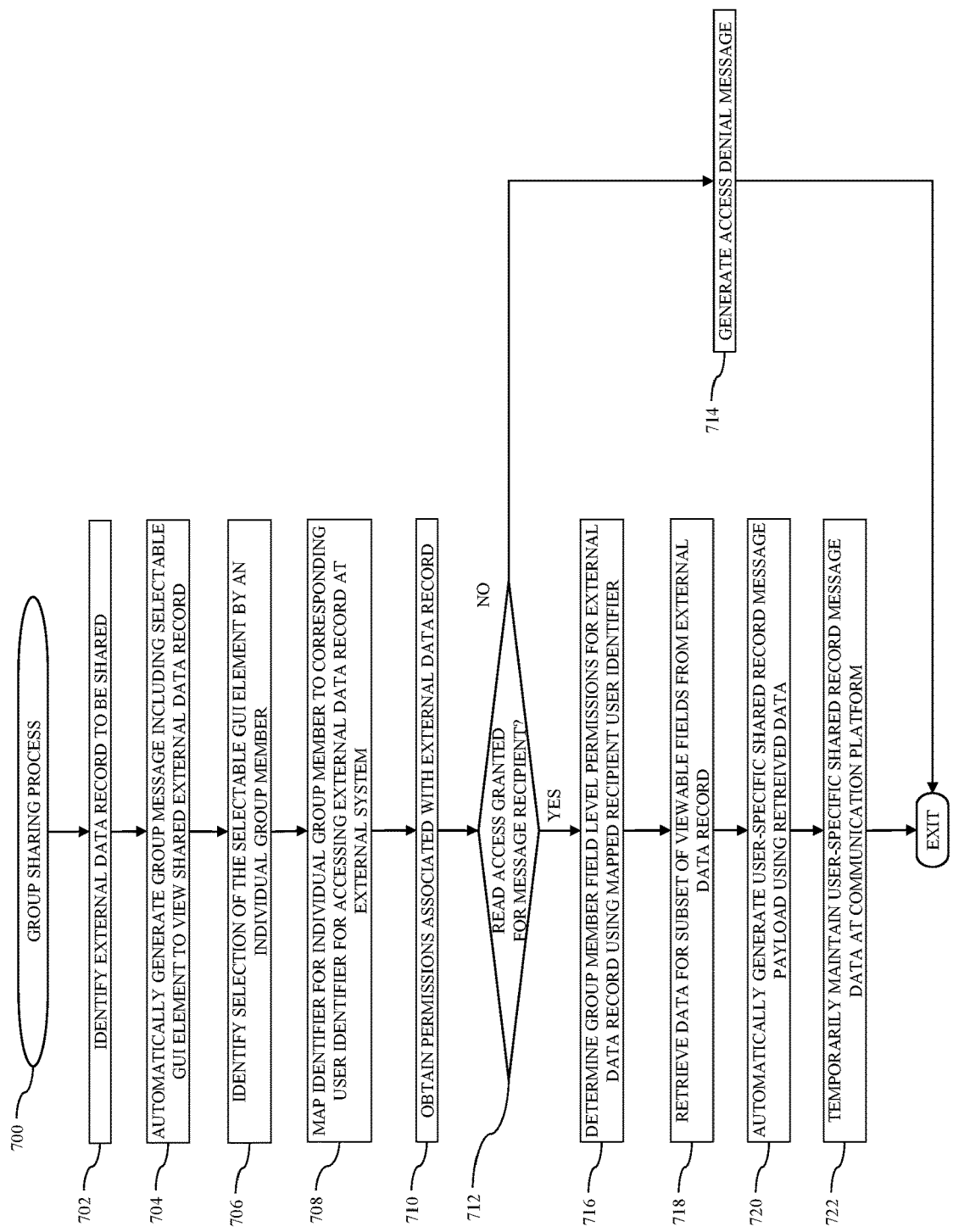
FIG. 7 is a flow diagram illustrating a group sharing process suitable for implementation by a secure sharing service in the computing system of FIG. 1 according to some example implementations.

FIG. 7 depicts an exemplary group sharing process 700 that may be implemented or otherwise performed to share access to a data record at an external system with participants in a group message conversation at a communication platform. For illustrative purposes, the following description may refer to elements mentioned above in connection with FIG. 1. In this regard, while portions of the group sharing process 700 may be performed by different elements of the computing system 100, for purposes of explanation, the subject matter is described herein in the context of the group sharing process 700 being primarily performed by the secure sharing service 104. It should be appreciated that the group sharing process 700 may include any number of additional or alternative tasks, the tasks need not be performed in the illustrated order and/or the tasks may be performed concurrently, and/or the group sharing process 700 may be incorporated into a more comprehensive procedure or process having additional functionality not described in detail herein. Moreover, one or more of the tasks shown and described in the context of FIG. 7 could be omitted from a practical implementation of the group sharing process 700 as long as the intended overall functionality remains intact.

Referring to FIG. 7, with continued reference to FIG. 1, the illustrated group sharing process 700 is initiated or otherwise performed by the secure sharing service 104 when a participant in a group message conversation at the communication platform 102 invokes the secure sharing service 104 to share access to a data record 126 at the external computing system 120 in the context of the group message conversation. As described above, when the secure sharing service 104 is invoked or otherwise receives a request to share a data record, the secure sharing service 104 may receive and analyze metadata associated with the conversation from which the request originates to determine the conversation is a group message or otherwise includes multiple message recipients before initiating the group sharing process 700. For purposes of explanation, the participant attempting to share access to the data record 126 may alternatively be referred to herein as the message sender, while the other participants in the group message conversation with whom the access to the data record 126 is to be shared are alternatively referred to herein as the message recipients.

In a similar manner as described above in the context of the direct sharing process 200, the illustrated group sharing process 700 initializes or otherwise begins by identifying the external data record to be shared within the group message conversation (task 702), for example, by the message sender providing a request to the secure sharing service 104 that includes an indication of the desired data record 126 to be shared. After identifying the selected data record to be shared, the group sharing process 700 automatically generates a group message including one or more selectable GUI elements to view the shared data record (task 704). In this regard, the selectable GUI element(s) are manipulable by individual participants in the group message conversation to obtain a user-specific shared data record message within the context of the group message conversation that reflects the field-level permissions of the shared data record 126 for that particular user. Thus, the depicted shared data record message within the group message conversation may vary from one group message recipient to another group message recipient.

After generating a group message including a selectable GUI element to view the shared data record, the group sharing process 700 identifies or otherwise detects selection of the GUI element(s) to view the shared data record by an individual member of the group conversation and maps or otherwise translates the user identifier(s) associated with that particular user at the communication platform to one or more corresponding user identifier(s) associated with that user at the external computing system for accessing the shared data record (tasks 706, 708). In this regard, in a similar manner as described above in the context of the direct sharing process 200, the secure sharing service 104 accesses a user identifier mapping table 134 and locates or otherwise identifies the entry in the user identifier mapping table 134 that includes the communication platform user identifier associated with that particular group message participant and identifies the external system user identifier maintained in association with that communication platform user identifier. As described above, when the user identifier mapping table 134 lacks an entry associated with that particular communication platform user identifier, the secure sharing service 104 may query the external computing system 120 to obtain the appropriate external system user identifier(s) to be associated with that user or otherwise assign a default guest user identifier at the external computing system 120 to the message recipient.

After determining the external system user identifiers associated with the message participants, the group sharing process 700 identifies or otherwise obtains permissions associated with the external data record to be shared and determines whether the particular group conversation participant has read access to the shared data record (task 710, 712). As described above, when the particular group message recipient does not have read access to the shared data record, the group sharing process 700 generates or otherwise provides a message within the web application at the communication platform that indicates that access to the selected data record is denied for that individual user (task 714). When the particular group message recipient has read access to the shared data record, the group sharing process 700 identifies or otherwise determines the field-level permissions for that particular group message recipient using that user's mapped external system user identifier and retrieves or otherwise obtains data for that user's particular subset of viewable fields from the selected data record at the external computing system (tasks 716, 718). For example, the secure sharing service 104 may generate or otherwise provide a query statement to the resource server 122 using the message recipient's mapped user identifier at the external computing system 120 to retrieve only the subset of fields of the selected data record 126 that are viewable to that particular group message recipient from the resource database 124 via the resource server 122.

Still referring to FIG. 7, the group sharing process 700 automatically generates payload for a user-specific shared data record message to be provided within the context of the group message conversation for that particular user using the retrieved data for that user's viewable subset of fields of the shared data record (task 720). For example, the secure sharing service 104 may automatically generate a shared data record message that includes the field names and corresponding retrieved values for the user's viewable fields of the selected data record 126 and provide the shared record message to the web application 116 for presentation as an utterance in the context of the group message conversation at the web application 116. In exemplary implementations, the group sharing process 700 only temporarily maintains the user-specific shared data record message at the communication platform before deleting or otherwise removing the retrieved values for the shared data record from presentation at the communication platform (task 722). In this regard, the shared data record message generated within the context of the group conversation is ephemeral and does not persist at the communication platform 102 beyond some limited temporary period of time, thereby preventing data leakage when participants in the group conversation change over time or when permissions associated with participants change over time. For example, in some implementations, the communication platform 102 and/or the web application 116 is configured to implement or similar feature to support a time-based deletion of the shared data record message after a threshold period of time has elapsed after the initial generation and/or presentation of the shared data record message. In other implementations, the communication platform 102 and/or the web application 116 is configured to store or otherwise maintain the shared data record message in the cache associated with the browser application 108 or other session data associated with the browser application 108 to support a session-based deletion of the shared data record message (e.g., when the user closes or exits the browser application 108, logs out of the communication platform 102 and/or the web application 116, switches to a different conversation at the communication platform 102, and/or the like). In this regard, the shared data record message generated within the context of the group conversation is not stored or maintained by the web application 116 at the communication platform 102.

Figure 8:
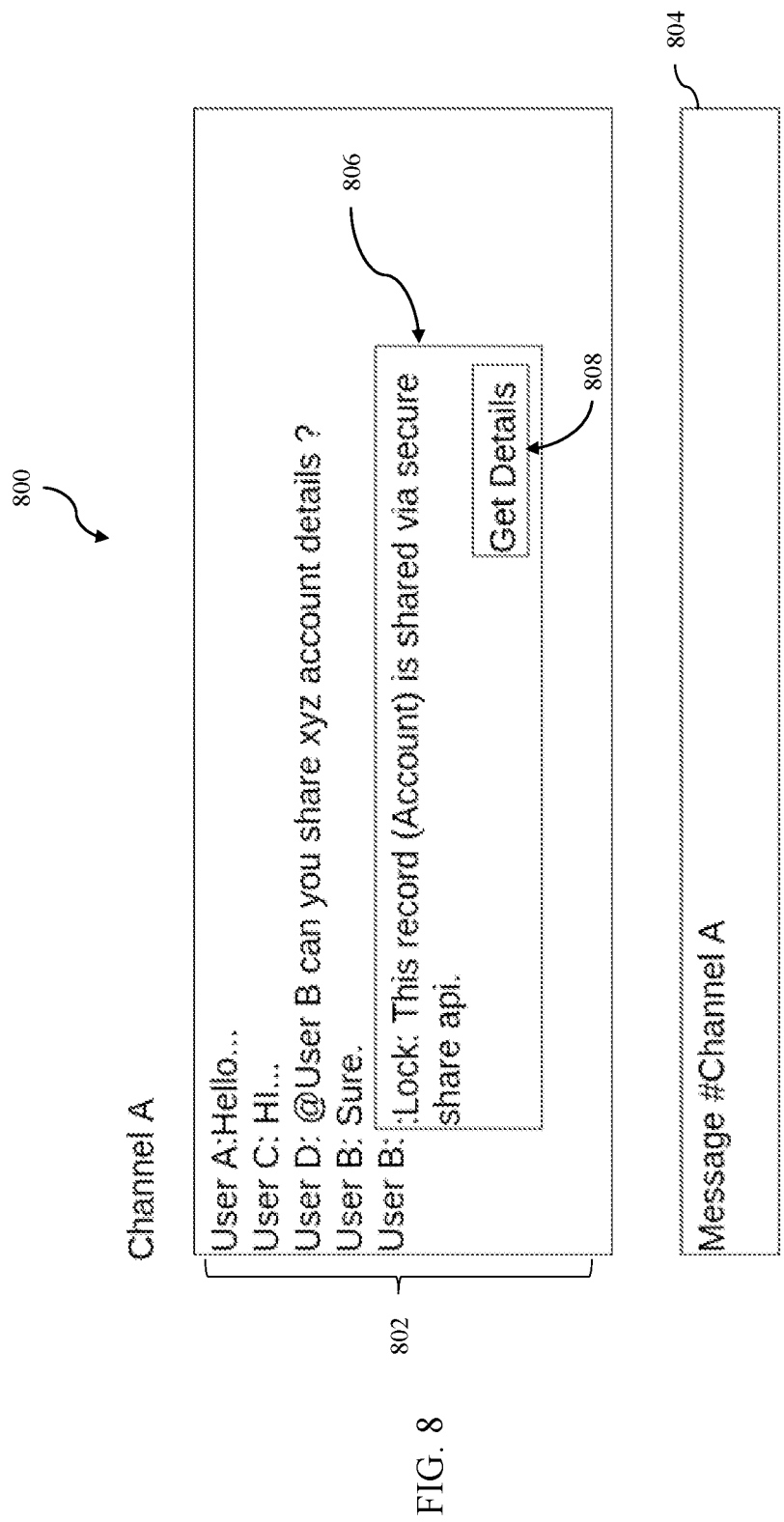
FIGS. 8-9 depict a sequence of GUI displays suitable for presentation by a web application at a communication platform in connection with the group sharing process of FIG. 7 according to some example implementations.
Figure 9:
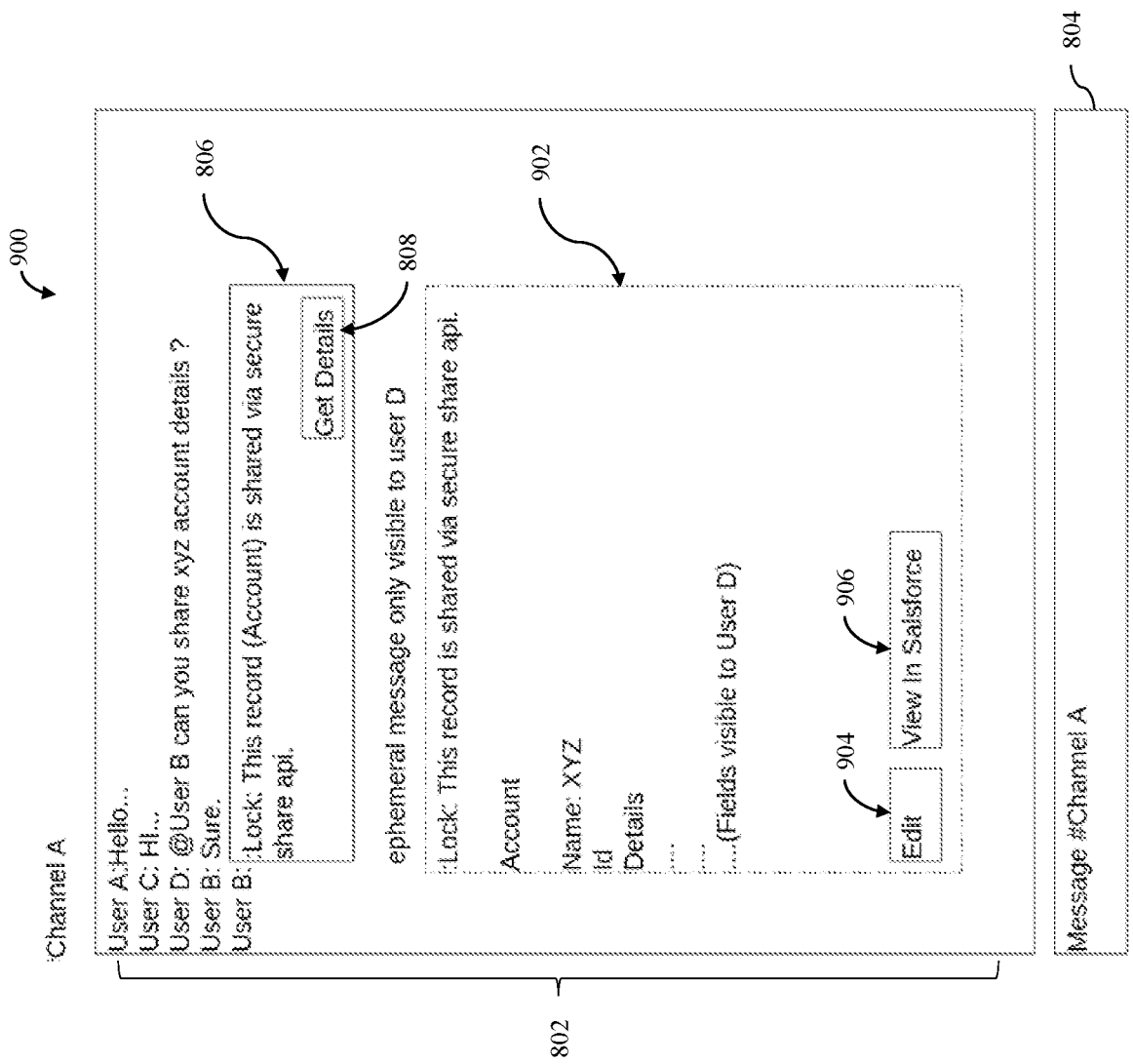

FIGS. 8-9 depict an exemplary sequence of conversation GUI displays that may be generated or otherwise presented by the web application 116 within a client application 108 in the context of a group message conversation (Channel A) at the communication platform 102 in connection with the group sharing process 700. In this regard, FIG. 8 depicts an initial state of a conversation GUI display 800 presented by the web application 116 for a group message conversation at the communication platform 102 between a message sender (User B) and multiple potential message recipients (User A, User C and User D). In a similar manner as described above, in some implementations, the conversation GUI display 800 is depicted using a widget or window-inside-browser-window in connection with an instance of the web application 116 provided to each of the client devices 106 associated with the group conversation participants via respective instances of client application 108 executing thereon. The conversation GUI display 800 includes a conversation region 802 that includes graphical representations of the utterances exchanged between conversation participants in a sequential or chronological order, along with a text box 804 or similar GUI element where a user can input text or otherwise content for a message or other utterance to be added to the group conversation and sent or otherwise presented to the other conversation participants.

In a similar manner as described above in the context of FIGS. 3-4, to initiate the group sharing process 700, the message sender (User B) may input a command to invoke the secure sharing service 104 within the text box 704 and provide indicia of the data record 126 that the user would like to share ("xyz") in connection with the command. After identifying the selected data record 126 for sharing and determining that the destination conversation for sharing the selected data record 126 is a group conversation, the secure sharing service 104 automatically generates a group message 806 that includes a button 808 or similar selectable GUI element to enable viewing of the fields of the shared data record 126 (e.g., task 704). As shown, the autogenerated group message 806 may be depicted as an utterance associated with the message sender.

FIG. 9 depicts an updated conversation GUI display 900 that includes a graphical representation of the autogenerated shared data record message 902 within the context of the group message conversation initially depicted in FIG. 8 in response to selection of the Get Details button 808 by an individual group message recipient (User D). In this regard, in response to selection of the Get Details button 808 by User D, the secure sharing service 104 maps the user identifier associated with User D at the communication platform 102 to a corresponding user identifier associated with User D at the external computing system 120. Thereafter, the secure sharing service 104 utilizes the mapped external system user identifier for User D to verify that User D has read access to the shared XYZ account database object 126 at the external computing system 120 before analyzing User D's field-level permissions with respect to the field-level security settings associated with the shared XYZ account database object 126 at the external computing system 120 to identify which fields of the shared XYZ account database object 126 are viewable to User D. The secure sharing service 104 then queries or otherwise retrieves values for the fields viewable to User D from the shared XYZ account database object 126 in the resource database 124 via the resource server 122 using the mapped external system user identifier(s) for User D for access and/or authorization. After retrieving values for the subset of fields of the shared XYZ account database object 126 that are viewable to User D, the secure sharing service 104 automatically generates the payload for the shared data record message 902 that includes the field names and corresponding retrieved values for User D's viewable fields of the shared XYZ account database object 126 and provides the payload for the shared data record message 902 to the web application 116 for presentation as an utterance in the context of the group message conversation at the web application 116. In this regard, the shared data record message 902 may be depicted to User D as an autogenerated utterance on behalf of User B. In a similar manner as described above, the shared data record message 902 includes buttons 904, 906 or similar selectable GUI elements that are manipulable by User D to initiate or otherwise perform one or more actions with respect to the shared XYZ account database object 126 at the external computing system 120.

As described above, the shared data record message 902 is ephemeral and only temporarily maintained at the communication platform 102, such that the shared data record message 902 does not persist within the conversation GUI display 900 at User D's client device 106. Additionally, the shared data record message 902 is specific to User D and is not depicted within instances of the conversation GUI display 800 at client devices 106 associated with the other group message participants. In this regard, a shared data record message generated for another group message participant (e.g., User A) may include retrieved values for a different subset of fields of the shared XYZ account database object 126. That is, other group message participants may be allowed to view either a greater or lesser number of fields of the shared XYZ account database object 126 depending on their respective field-level permissions. Additionally, as new participants join the group conversation, only the group message 806 indicating the existence of a shared external data record 126 may be provided within the instances of the conversation GUI display 800 at client devices 106 associated with those new participants, thereby preventing data leakage or unauthorized viewing of fields of the shared data record 126 by new group message participants without the secure sharing service 104 applying the read access and field-level permissions at the external computing system 120 that apply to those new participants (e.g., tasks 708, 710, 712, 714, 716 and 718).

Figure 10:
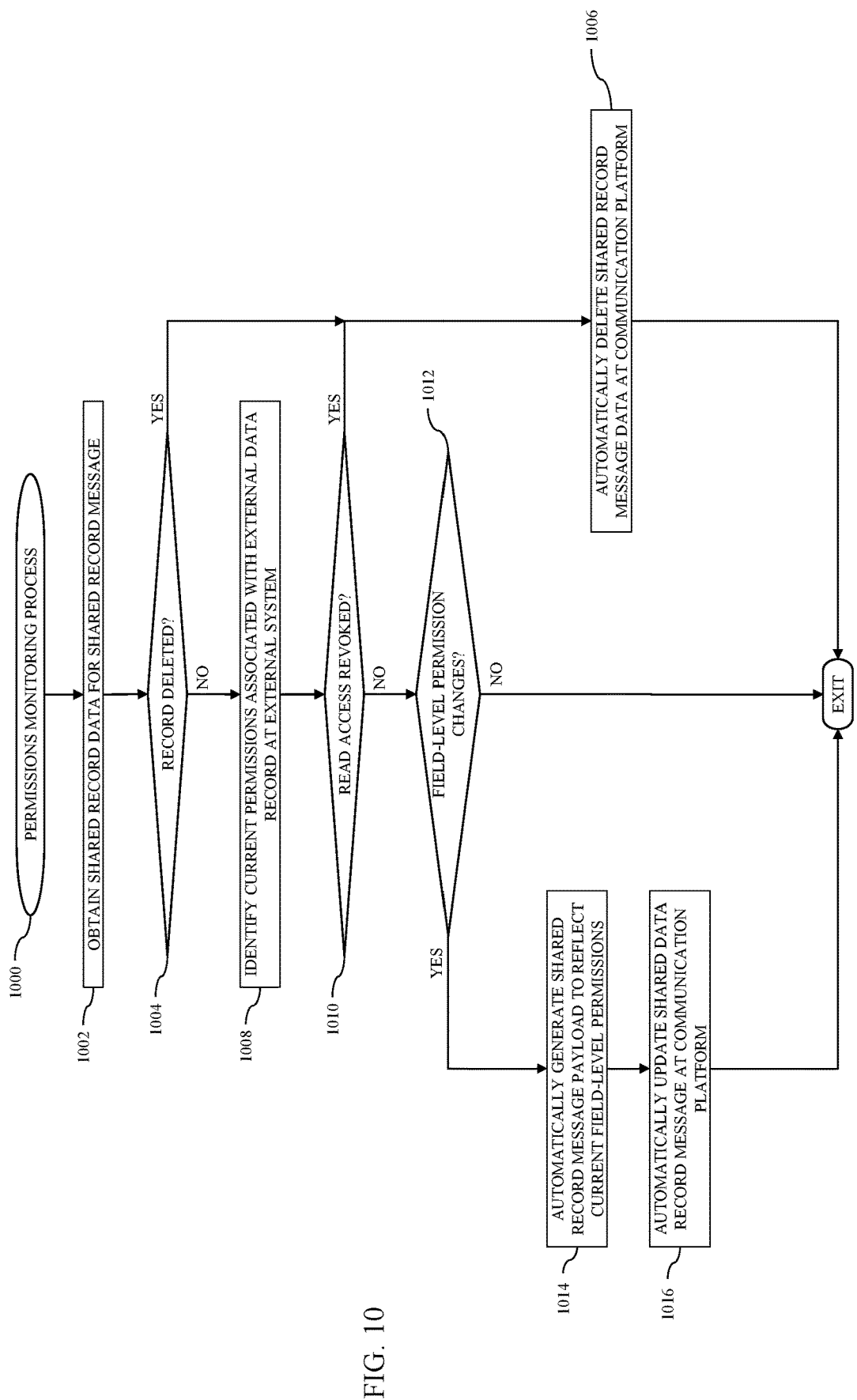
FIG. 10 is a flow diagram illustrating a permissions monitoring process suitable for implementation by a secure sharing service in the computing system of FIG. 1 according to some example implementations.

FIG. 10 depicts an exemplary permissions monitoring process 1000 that may be implemented or otherwise performed to monitor permissions associated with a shared data record to prevent unauthorized access when permissions associated with the shared data record change at an external system. For illustrative purposes, the following description may refer to elements mentioned above in connection with FIG. 1. In this regard, while portions of the permissions monitoring process 1000 may be performed by different elements of the computing system 100, for purposes of explanation, the subject matter is described herein in the context of the permissions monitoring process 1000 being primarily performed by the secure sharing service 104. It should be appreciated that the permissions monitoring process 1000 may include any number of additional or alternative tasks, the tasks need not be performed in the illustrated order and/or the tasks may be performed concurrently, and/or the permissions monitoring process 1000 may be incorporated into a more comprehensive procedure or process having additional functionality not described in detail herein. Moreover, one or more of the tasks shown and described in the context of FIG. 10 could be omitted from a practical implementation of the permissions monitoring process 1000 as long as the intended overall functionality remains intact.

In exemplary implementations, the permissions monitoring process 1000 is asynchronously performed by the secure sharing service 104 to continually monitor previously-shared data records for permissions changes to a shared data record that require changes to its associated shared data record message(s) to prevent unauthorized access to the shared data record. For example, if the read access permissions or field-level security settings associated with a shared data record 126 at the external computing system 120 are changed, the secure sharing service 104 to may detect the changes and update the shared record data 136 and/or the conversation data 118 to reflect the current or most recent permissions associated with the shared record data 136 substantially in real-time. Additionally, or alternatively, the secure sharing service 104 also detects changes to user permissions and updates the shared record data 136 and/or the conversation data 118 to reflect changes to a conversation participant's permissions substantially in real-time.

The permissions monitoring process 1000 initializes or otherwise begins by retrieving or otherwise obtaining the shared record data associated with a previously-generated shared data record message and verifying whether the data record associated with that shared data record message still exists, and if not, automatically deletes or otherwise removes the shared record data maintained outside of the external computing system at the communication platform and/or the secure sharing service (tasks 1002, 1004, 1006). When the shared data records still exists at the external computing system, the permissions monitoring process 1000 continues by analyzing or otherwise identifying the current permissions associated with the shared data record with respect to the current permissions associated with the conversation participant(s) to determine whether or not read access has been revoked or whether changes have occurred with respect to the shared data record that would prevent visibility or access (e.g., changing from public to private), and if so, automatically deletes or otherwise removes the shared record data maintained outside of the external computing system at the communication platform and/or the secure sharing service (tasks 1010, 1006). For example, in one or more implementations, the secure sharing service 104 utilizes an entry in a secure sharing table 136 to obtain the identifier associated with the shared data record 126 at the external computing system 120 (e.g., a record ID) and the mapped external system user identifiers associated with the message sender and message recipient(s). The secure sharing service 104 then queries or otherwise polls the external computing system 120 using the retrieved identifiers to verify that the shared data record 126 still exists as well as whether the message sender and message recipient(s) still have read access to the shared data record 126. When one of the conversation participants no longer has read access to the shared data record 126, or when the shared data record 126 no longer exists in the resource database 124, the secure sharing service 104 automatically deletes any retrieved values for fields of the shared data record 126 from the shared record data 136 and/or the conversation data 118. In this regard, the secure sharing service 104 may utilize the conversation identifier and/or the communication platform user identifiers associated with the message sender and message recipient(s) to automatically remove the previously generated shared data record message (or the payload thereof) from the conversation, for example, by overwriting the previously generated shared data record message with an access denied message within the context of the conversation.

When read access for the shared data record has not been revoked or the read access permissions with respect to the shared data record are otherwise unchanged, the permissions monitoring process 1000 continues by determining whether any field-level permission changes have occurred with respect to the shared data record, and if so, automatically generates updated payload for the shared data record message that reflects the current field-level permissions and then automatically updates the corresponding shared data record message presented at the communication platform to reflect the current field-level permissions (tasks 1012, 1014, 1016). For example, when a message recipient no longer has read access for a particular field of the shared data record 126 that he or she was previously able to view, the secure sharing service 104 automatically deletes the previously-retrieved value for that field of the shared data record 126 from the shared record data 136 and/or the conversation data 118 such that the shared data record message presented within the web application 116 to that message recipient no longer depicts the value of that field of the shared data record 126. On the other hand, when the field-level security settings of the shared data record 126 change to allow the message sender and/or the message recipient to view additional fields of the shared data record 126 that have not been previously retrieved from the external computing system 120, the secure sharing service 104 may automatically retrieve the current value(s) for those additional fields from the shared data record 126 at the external computing system 120 and dynamically update the shared record data 136 and/or the conversation data 118 to include the retrieved values for those additional fields, such that the shared data record message presented within the web application 116 is dynamically updated to reflect the current field-level permissions for the conversation participants.

In one or more implementations, the permissions monitoring process 1000 is continually and asynchronously performed by the secure sharing service 104 incrementally progressing through entries in the secure sharing table 136 to verify, for each previously-generated shared data record message, whether or not the permissions or security settings associated with that message have changed and dynamically update the conversation when the permissions or security settings have changed. For example, if a conversation participant changes employment, roles or positions, any shared data record message(s) that would otherwise be viewable to that conversation participant within conversations at the communication platform 102 are automatically and dynamically updated substantially in real-time so that what is presented to that conversation participant accurately reflects the conversation participant's current status. Thus, data leakage or other unauthorized data access by conversation participants at the communication platform 102 is prevented when the role or status of conversation participants change in a manner that would prevent access at the external computing system 120. Similarly, if permissions or security settings associated with a previously-shared data record 126 are changed at the external computing system 120 to increase or decrease visibility with respect to the data record 126, any shared data record message(s) associated with that shared data record 126 are automatically and dynamically updated substantially in real-time so that shared data record message(s) associated with that shared data record 126 at the communication platform 102 reflect the current or most recent permissions or security settings associated with that data record 126 at the external computing system 120. Thus, data leakage or other unauthorized data access to the data record 126 (or fields thereof) at the communication platform 102 is prevented when the permissions or settings associated with the data record 126 change in a manner that would prevent access at the external computing system 120.

Figure 11:
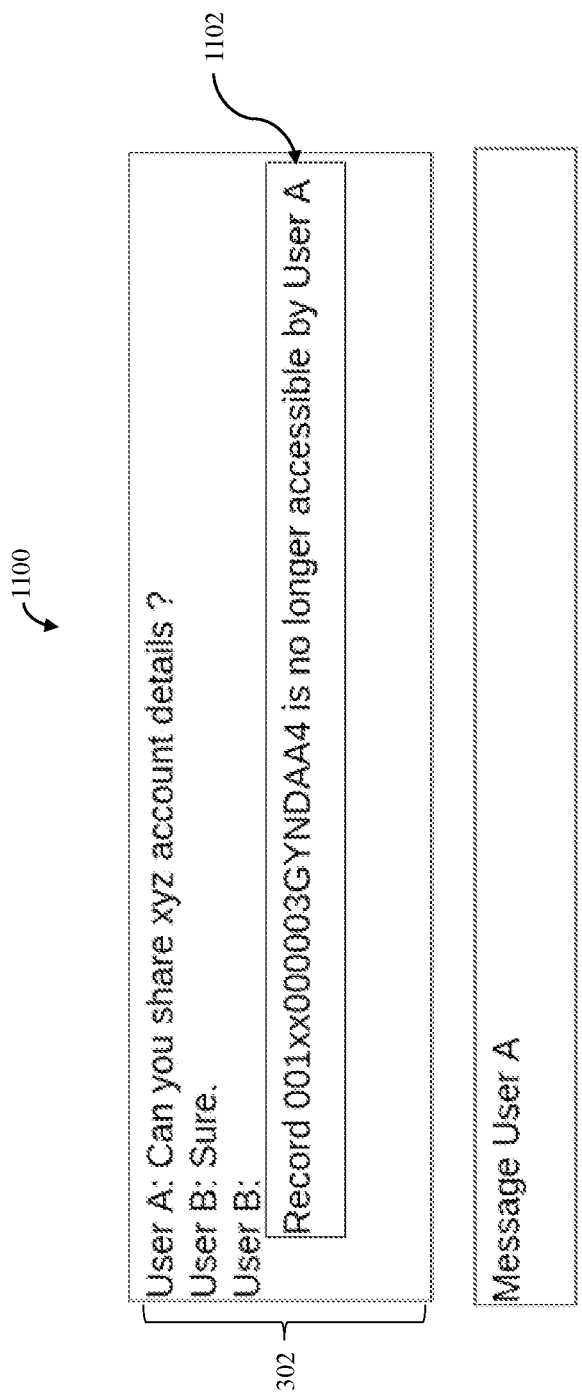
FIG. 11 depicts a GUI display suitable for presentation by a web application at a communication platform in connection with the permissions monitoring process of FIG. 10 according to some example implementations.

FIG. 11 depicts an updated conversation GUI display 1100 that reflects a subsequent state of the direct message conversation GUI display 600 of FIG. 6 when a change occurs to the read access permissions associated with at least one of the message recipient User A or the XYZ account database object 126. For example, the secure sharing service 104 may periodically analyze the entry in the secure sharing table 136 associated with the shared data record message 602 to verify or otherwise confirm the permissions associated with the XYZ account database object 126 and the permissions associated with the direct message conversation participants User A and User B still allow the same common subset of fields of the XYZ account database object 126 to be viewed by both User A and User B. In this regard, when the read access permissions associated with the XYZ account database object 126 at the external computing system 120 change to prevent User A from having read access, or the role, status or other metadata associated with User A at the external computing system 120 changes such that User A no longer has read access to the XYZ account database object 126 (e.g., because User A is no longer affiliated with the tenant to which the XYZ account database object 126 belongs), the secure sharing service 104 determines the read access for the XYZ account database object 126 has changed and automatically removes the previously retrieved values for the XYZ account database object 126 from the shared record data 136 and/or the conversation data 118 at the communication platform 102 to prevent User A from viewing the XYZ account database object 126. For example, as shown in FIG. 11, the conversation region 302 may be dynamically updated by removing the shared data record message 602 and replacing the shared data record message 602 in the conversation sequence with an access denied message 1102 that indicates User A no longer has read access. In this manner, unauthorized access by User A to the fields of the XYZ account database object 126 at the communication platform 102 can be prevented substantially in real-time when either the permissions associated with the XYZ account database object 126 or the permissions associated with User A change at the external computing system 120.

It should be noted that although FIGS. 10-11 may primarily describe and depict the permissions monitoring process 1000 in the context of a direct message conversation, the permissions monitoring process 1000 may be implemented in an equivalent manner for group message conversations. For example, referring to FIG. 9, when either the permissions associated with the XYZ account database object 126 or the permissions associated with User D change at the external computing system 120 during the temporary duration of time while the ephemeral User D-specific shared data record message 902 would otherwise be displayed before timeout or automated removal, the secure sharing service 104 and/or the permissions monitoring process 1000 may automatically and dynamically update the instance of the conversation GUI display 900 presented by the web application 116 at the User D client device 106 to remove the User D-specific shared data record message 902 (e.g., by displaying an access denied message) or otherwise modify the payload or fields depicted within the User D-specific shared data record message 902 substantially in real-time.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 12A:
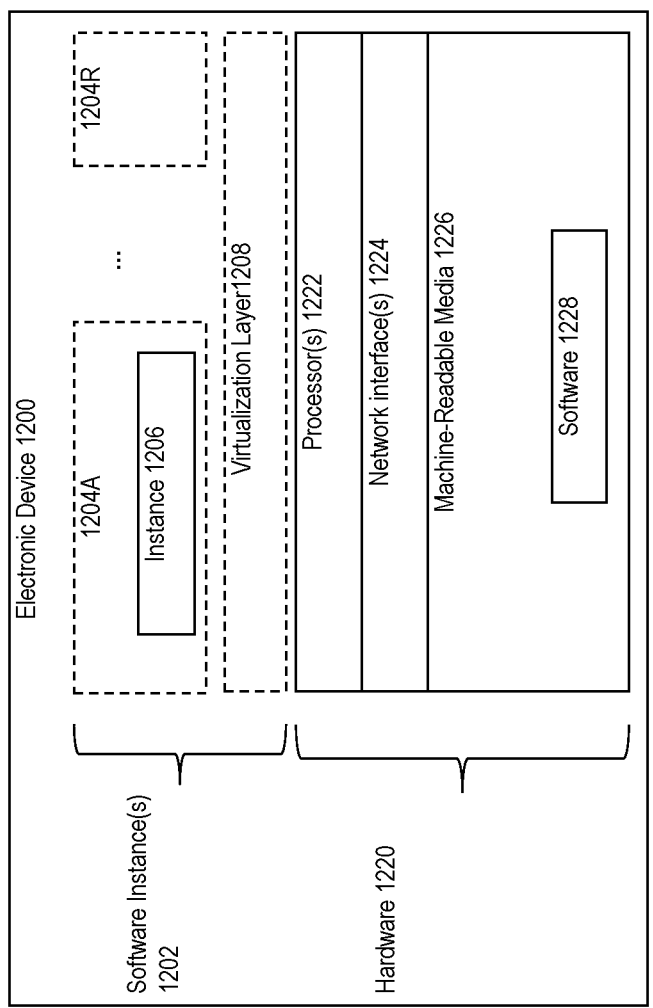
FIG. 12A is a block diagram illustrating an electronic device according to some example implementations.

FIG. 12A is a block diagram illustrating an electronic device 1200 according to some example implementations. FIG. 12A includes hardware 1220 comprising a set of one or more processor(s) 1222, a set of one or more network interfaces 1224 (wireless and/or wired), and machine-readable media 1226 having stored therein software 1228 (which includes instructions executable by the set of one or more processor(s) 1222). The machine-readable media 1226 may include non-transitory and/or transitory machine-readable media. Each of the previously described clients and the secure sharing service may be implemented in one or more electronic devices 1200. In one implementation: 1) each of the clients is implemented in a separate one of the electronic devices 1200 (e.g., in end user devices where the software 1228 represents the software to implement clients to interface directly and/or indirectly with the secure sharing service (e.g., software 1228 represents a web browser, a native client, a portal, a command-line interface, and/or an application programming interface (API) based upon protocols such as Simple Object Access Protocol (SOAP), Representational State Transfer (REST), etc.)); 2) the secure sharing service is implemented in a separate set of one or more of the electronic devices 1200 (e.g., a set of one or more server devices where the software 1228 represents the software to implement the secure sharing service); and 3) in operation, the electronic devices implementing the clients and the secure sharing service would be communicatively coupled (e.g., by a network) and would establish between them (or through one or more other layers and/or or other services) connections for submitting requests and/or making API calls to the secure sharing service. Other configurations of electronic devices may be used in other implementations (e.g., an implementation in which the client and the secure sharing service are implemented on a single one of electronic device 1200).

During operation, an instance of the software 1228 (illustrated as instance 1206 and referred to as a software instance; and in the more specific case of an application, as an application instance) is executed. In electronic devices that use compute virtualization, the set of one or more processor(s) 1222 typically execute software to instantiate a virtualization layer 1208 and one or more software container(s) 1204A-1204R (e.g., with operating system-level virtualization, the virtualization layer 1208 may represent a container engine (such as Docker Engine by Docker, Inc. or rkt in Container Linux by Red Hat, Inc.) running on top of (or integrated into) an operating system, and it allows for the creation of multiple software containers 1204A-1204R (representing separate user space instances and also called virtualization engines, virtual private servers, or jails) that may each be used to execute a set of one or more applications; with full virtualization, the virtualization layer 1208 represents a hypervisor (sometimes referred to as a virtual machine monitor (VMM)) or a hypervisor executing on top of a host operating system, and the software containers 1204A-1204R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1228 is executed within the software container 1204A on the virtualization layer 1208. In electronic devices where compute virtualization is not used, the instance 1206 on top of a host operating system is executed on the "bare metal" electronic device 1200. The instantiation of the instance 1206, as well as the virtualization layer 1208 and software containers 1204A-1204R if implemented, are collectively referred to as software instance(s) 1202.

Alternative implementations of an electronic device may have numerous variations from that described above. For example, customized hardware and/or accelerators might also be used in an electronic device.

Figure 12B:
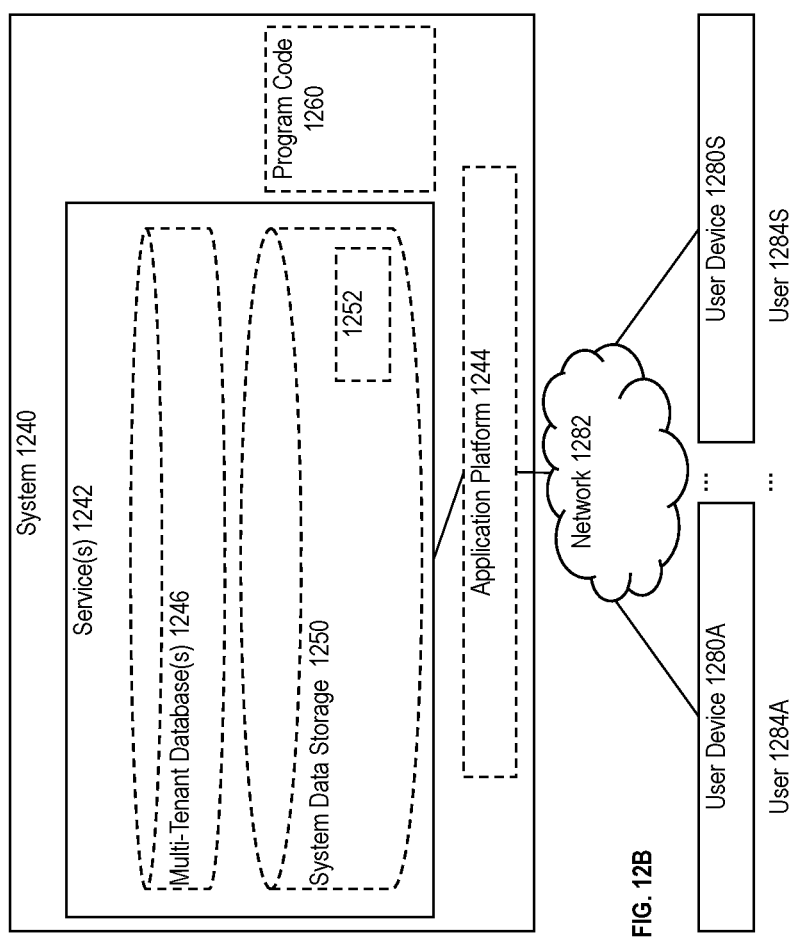
FIG. 12B is a block diagram of a deployment environment according to some example implementations.

FIG. 12B is a block diagram of a deployment environment according to some example implementations. A system 1240 includes hardware (e.g., a set of one or more server devices) and software to provide service(s) 1242, including the secure sharing service (e.g., to support one or more of the above-described processes 200, 700, 1000). In some implementations the system 1240 is in one or more datacenter(s). These datacenter(s) may be: 1) first party datacenter(s), which are datacenter(s) owned and/or operated by the same entity that provides and/or operates some or all of the software that provides the service(s) 1242; and/or 2) third-party datacenter(s), which are datacenter(s) owned and/or operated by one or more different entities than the entity that provides the service(s) 1242 (e.g., the different entities may host some or all of the software provided and/or operated by the entity that provides the service(s) 1242). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1240 is coupled to user devices 1280A-1280S over a network 1282. The service(s) 1242 may be on-demand services that are made available to one or more of the users 1284A-1284S working for one or more entities other than the entity which owns and/or operates the on-demand services (those users sometimes referred to as outside users) so that those entities need not be concerned with building and/or maintaining a system, but instead may make use of the service(s) 1242 when needed (e.g., when needed by the users 1284A-1284S). The service(s) 1242 may communicate with each other and/or with one or more of the user devices 1280A-1280S via one or more APIs (e.g., a REST API). In some implementations, the user devices 1280A-1280S are operated by users 1284A-1284S, and each may be operated as a client device and/or a server device. In some implementations, one or more of the user devices 1280A-1280S are separate ones of the electronic device 1200 or include one or more features of the electronic device 1200.

In some implementations, the system 1240 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1240 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1240 may include an application platform 1244 that enables PAAS for creating, managing, and executing one or more applications developed by the provider of the application platform 1244, users accessing the system 1240 via one or more of user devices 1280A-1280S, or third-party application developers accessing the system 1240 via one or more of user devices 1280A-1280S.

In some implementations, one or more of the service(s) 1242 may use one or more multi-tenant databases 1246, as well as system data storage 1250 for system data 1252 accessible to system 1240. In certain implementations, the system 1240 includes a set of one or more servers that are running on server electronic devices and that are configured to handle requests for any authorized user associated with any tenant (there is no server affinity for a user and/or tenant to a specific server). The user devices 1280A-1280S communicate with the server(s) of system 1240 to request and update tenant-level data and system-level data hosted by system 1240, and in response the system 1240 (e.g., one or more servers in system 1240) automatically may generate one or more Structured Query Language (SQL) statements (e.g., one or more SQL queries) that are designed to access the desired information from the multi-tenant database(s) 1246 and/or system data storage 1250.

In some implementations, the service(s) 1242 are implemented using virtual applications dynamically created at run time responsive to queries from the user devices 1280A-1280S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1260 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1244 includes an application setup mechanism that supports application developers' creation and management of applications, which may be saved as metadata by save routines. Invocations to such applications, including the secure sharing service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1282 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1240 and the user devices 1280A-1280S.

Each user device 1280A-1280S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1240. For example, the user interface device can be used to access data and applications hosted by system 1240, and to perform searches on stored data, and otherwise allow one or more users 1284A-1284S to interact with various GUI pages that may be presented to the one or more of users 1284A-1284S. User devices 1280A-1280S might communicate with system 1240 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1280A-1280S might include an HTTP client, commonly referred to as a "browser," for sending and receiving HTTP messages to and from server(s) of system 1240, thus allowing users 1284A-1284S of the user devices 1280A-1280S to access, process and view information, pages and applications available to it from system 1240 over network 1282.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of sharing access to a data record at an external system in a conversation at a communication platform, the method comprising:
    receiving an indication of the data record to be shared with a message recipient from a participant in the conversation within a graphical user interface (GUI) display comprising a sequence of utterances of the conversation at the communication platform, the conversation including the participant and the message recipient;
    identifying a user identifier for the message recipient at the external system using an identifier associated with the message recipient at the communication platform;
    identifying field-level permissions associated with the data record at the external system;
    identifying a viewable subset of fields of the data record viewable by the message recipient based at least in part on the field-level permissions associated with the data record using the user identifier;
    obtaining values for the viewable subset of fields of the data record from the external system;
    automatically generating a shared data record message associated with the conversation at the communication platform, wherein the shared data record message comprises the values retrieved from the external system for only the viewable subset of fields of the data record obtained from the external system that the message recipient would be allowed to view if the message recipient were logged into the external system to view the data record at the external system; and
    displaying the shared data record message including the values retrieved from the external system for only the viewable subset of fields of the data record within the GUI display as an utterance by the participant within the sequence of utterances of the conversation.

2. The method of claim 1, further comprising identifying a second user identifier at the external system for the participant in the conversation using a second identifier associated with the participant at the communication platform, wherein identifying the viewable subset of fields comprises:
    identifying a first subset of fields of the data record viewable by the message recipient based on the field-level permissions associated with the data record using the user identifier;
    identifying a second subset of fields of the data record viewable by the participant based on the field-level permissions associated with the data record using the second user identifier; and
    identifying the viewable subset of fields of the data record that are common to both the first subset and the second subset.

3. The method of claim 2, wherein:
    obtaining the values for the viewable subset of fields comprises retrieving, from the external system over a communications network, the values for the viewable subset of fields of the data record that are common to both the first subset of fields of the data record viewable by the message recipient and the second subset of fields of the data record viewable by the participant; and
    automatically generating the shared data record message comprises automatically generating the shared data record message including the values retrieved for the viewable subset of fields of the data record within the conversation at the communication platform.

4. The method of claim 1, further comprising automatically removing the shared data record message from the conversation at the communication platform in response to a change to the field-level permissions associated with the data record at the external system.

5. The method of claim 1, further comprising automatically removing the shared data record message from the conversation at the communication platform in response to a change to the field-level permissions associated with the user identifier for the message recipient at the external system.

6. The method of claim 1, wherein automatically generating the shared data record message comprises:
    automatically generating a selectable graphical user interface element for viewing the data record within the conversation at the communication platform; and
    in response to selection of the selectable graphical user interface element, automatically generating the shared data record message including the values for the viewable subset of fields of the data record obtained from the external system within the conversation at the communication platform.

7. The method of claim 6, further comprising automatically removing the shared data record message including the values for the viewable subset of fields of the data record obtained from the external system from the conversation at the communication platform after a threshold duration of time.

8. The method of claim 6, wherein automatically generating the shared data record message comprises automatically generating a user-specific shared data record message for the message recipient in response to selection of the selectable graphical user interface element by the message recipient.

9. The method of claim 1, wherein identifying the user identifier comprises mapping the identifier associated with the message recipient at the communication platform to the user identifier for the message recipient at the external system using user identification mapping data.

10. The method of claim 1, wherein identifying the user identifier comprises automatically assigning a guest user identifier at the external system to the message recipient in the absence of an existing user identifier for the participant at the external system.

11. A non-transitory machine-readable storage medium that provides instructions that, when executed by a processor, are configurable to cause said processor to perform operations comprising:
    receiving an indication of a shared data record to be shared with a message recipient from a participant in a conversation within a graphical user interface (GUI) display comprising a sequence of utterances of the conversation at a communication platform, the conversation including the participant and the message recipient;

identifying an external computing system user identifier for the message recipient in the conversation at the communication platform using a communication platform user identifier associated with the message recipient;

identifying field-level permissions associated with the shared data record at an external computing system;

identifying a viewable subset of fields of the shared data record that are viewable by the message recipient based at least in part on the field-level permissions associated with the shared data record using the external computing system user identifier;

obtaining values for the viewable subset of fields of the shared data record from the external computing system over a communications network;

automatically generating a shared data record message within the conversation at the communication platform, wherein the shared data record message includes the values for only the viewable subset of fields of the shared data record obtained from the external computing system that the message recipient would be allowed to view if the message recipient were logged into the external computing system to view the shared data record at the external computing system; and displaying the shared data record message including the values retrieved from the external computing system for only the viewable subset of fields of the shared data record within the GUI display as an utterance by the participant within the sequence of utterances of the conversation.

12. The non-transitory machine-readable storage medium of claim 11, wherein the instructions are configurable to cause said processor to:

identify a second external computing system user identifier for the participant in the conversation at the communication platform using a second communication platform identifier associated with the participant; and identify the viewable subset of fields of the shared data record by identifying an intersection of a first subset of fields of the shared data record that are viewable by the message recipient based on the external computing system user identifier and a second subset of fields of the shared data record that are viewable by the participant based on the second external computing system user identifier.

13. The non-transitory machine-readable storage medium of claim 11, wherein the instructions are configurable to cause said processor to automatically remove the shared data record message from the conversation at the communication platform in response to a change to the field-level permissions associated with the shared data record at the external computing system.

14. The non-transitory machine-readable storage medium of claim 11, wherein the instructions are configurable to cause said processor to automatically remove the shared data record message from the conversation at the communication platform in response to a change to second permissions associated with the external computing system user identifier for the participant at the external computing system.

15. The non-transitory machine-readable storage medium of claim 11, wherein the instructions are configurable to cause said processor to automatically generate a selectable graphical user interface element for viewing the shared data record within the conversation at the communication platform and automatically generating the shared data record message that is specific to the message recipient within the conversation at the communication platform in response to selection of the selectable graphical user interface element by the message recipient.

16. The non-transitory machine-readable storage medium of claim 11, wherein the instructions are configurable to cause said processor to automatically remove the shared data record message from within the conversation at the communication platform after a threshold duration of time.

17. The non-transitory machine-readable storage medium of claim 11, wherein the instructions are configurable to cause said processor to identify the external computing system user identifier for the participant by automatically assigning a guest user identifier at the external computing system to the message recipient in the absence of an existing external computing system user identifier associated with the communication platform user identifier.

18. A system comprising:

at least one non-transitory machine-readable storage medium that stores software; and at least one processor, coupled to the at least one non-transitory machine-readable storage medium, to execute the software that implements a secure sharing service and that is configurable to share access to a data record at an external computing system coupled to a communications network in a conversation at a communication platform coupled to the communications network by:

receiving an indication of the data record to be shared with a message recipient from a participant in the conversation within a graphical user interface (GUI) display comprising a sequence of utterances of the conversation at the communication platform, the conversation including the participant and the message recipient;

identifying a user identifier for the message recipient at the external computing system using an identifier associated with the message recipient at the communication platform;

identifying field-level permissions associated with the data record at the external computing system;

identifying a viewable subset of fields of the data record viewable by the message recipient based at least in part on the field-level permissions associated with the data record using the user identifier;

obtaining values for the viewable subset of fields of the data record from the external computing system;

automatically generating a shared data record message associated with the conversation at the communication platform, wherein the shared data record message comprises the values for only the viewable subset of fields of the data record obtained from the external computing system that the message recipient would be allowed to view if the message recipient were logged into the external computing system to view the data record at the external computing system; and displaying the shared data record message including the values retrieved from the external computing system for only the viewable subset of fields of the data record within the GUI display as an utterance by the participant within the sequence of utterances of the conversation.

19. The system of claim 18, wherein the secure sharing service is configurable to automatically remove the shared data record message from the conversation at the communication platform in response to a change to the field-level permissions associated with the data record at the external computing system.

20. The method of claim 1, wherein automatically generating the shared data record message comprises automatically generating an ephemeral user-specific shared data record message that does not persist at the communication platform.

* * * * *